(12) United States Patent
Sakaguchi et al.

(10) Patent No.: US 7,969,709 B2
(45) Date of Patent: Jun. 28, 2011

(54) LAMINATED CERAMIC ELECTRONIC COMPONENT

(75) Inventors: Tomoya Sakaguchi, Hokkaido (JP); Yukihito Yamashita, Hokkaido (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 234 days.

(21) Appl. No.: 12/416,258

(22) Filed: Apr. 1, 2009

(65) Prior Publication Data

US 2009/0284896 A1 Nov. 19, 2009

(30) Foreign Application Priority Data

Apr. 7, 2008 (JP) ................................ 2008-099031

(51) Int. Cl.
*H01G 4/06* (2006.01)
(52) U.S. Cl. ..... 361/311; 361/312; 361/313; 361/308.1; 361/321.1; 361/321.2
(58) Field of Classification Search .................. 361/311, 361/312–313, 321.1, 321.2, 321.4, 306.1, 361/306.3, 301.2, 301.4, 308.1, 309
See application file for complete search history.

(56) References Cited

U.S. PATENT DOCUMENTS

| | | | | |
|---|---|---|---|---|
| 6,061,227 A * | 5/2000 | Nogi | ............................. | 361/303 |
| 6,072,687 A * | 6/2000 | Naito et al. | ................... | 361/303 |
| 6,104,599 A * | 8/2000 | Ahiko et al. | ................ | 361/306.3 |
| 6,115,264 A * | 9/2000 | Nosaka | ........................ | 361/821 |
| 6,191,933 B1 * | 2/2001 | Ishigaki et al. | ............... | 361/309 |
| 6,327,134 B1 * | 12/2001 | Kuroda et al. | ................ | 361/303 |
| 6,704,189 B2 * | 3/2004 | Yoshii et al. | ................ | 361/308.1 |
| 6,829,134 B2 * | 12/2004 | Yamauchi et al. | ............ | 361/303 |
| 7,113,389 B2 * | 9/2006 | Ishifune et al. | ............ | 361/306.3 |
| 7,224,572 B2 * | 5/2007 | Togashi et al. | ............ | 361/306.3 |
| 7,362,559 B2 * | 4/2008 | Tominaga | .................. | 361/306.1 |

FOREIGN PATENT DOCUMENTS

| | | |
|---|---|---|
| JP | 08-236391 A | 9/1996 |
| JP | 2001-015377 A | 1/2001 |

* cited by examiner

*Primary Examiner* — Nguyen T Ha

(57) ABSTRACT

A laminated ceramic electronic component includes a ceramic element and two external electrodes on both end surfaces of the ceramic element. The ceramic element includes a function part and lead parts thinner than the function part. Internal electrode layers are provided facing each other via a ceramic layer therebetween in the function part. The internal electrode layers are drawn out of the function part in the lead part. The external electrode includes an extended part and a curled part. The extended part is formed from the lead part through the function part on the main face. On the main face, the part of the extended part in the lead part is lower than the part of the function part. The curled part is formed from the end face of the ceramic element through the surface of the part of the extended part in the lead part on the main face.

20 Claims, 4 Drawing Sheets

LAMINATED CERAMIC ELECTRONIC COMPONENT

BACKGROUND OF THE INVENTION

1. Field of the Invention

The present invention relates to a laminated ceramic electronic component used for an electronic device.

2. Background Art

In recent years, a demand has been increasing for higher performance, downsizing, and thickness reduction in electronic devices as represented by a mobile communication device. Following this, a demand has been increasing for higher density and higher performance in electronic components as well. Consequently, when mounting electronic components on a printed wiring board, higher density is required while reducing the number of electronic components mounted on the surface of a printed wiring board for downsizing. For this purpose, development has been made of a component-embedded printed wiring board structured to include electronic components in the board.

Laminated ceramic electronic components used for a component-embedded printed wiring board include a laminated ceramic capacitor and a laminated varistor. A laminated ceramic capacitor, for example, is demanded that is small-size, slim, and large-capacitance with a length of 1.0 mm; width, 0.5 mm; and thickness, 0.1 mm to 0.5 mm.

FIG. 7 is a sectional view of a conventional component-embedded printed wiring board. FIG. 8 is a sectional view of a conventional laminated ceramic capacitor. As shown in FIG. 7, component-embedded printed wiring board (wiring board, hereinafter) 31 includes insulative resin layer 32, laminated ceramic capacitor (capacitor, hereinafter) 40, and wiring pattern 35. Insulative resin layer 32 made of such as a glass epoxy resin has interlayer connection hole 33 vertically provided therein. Capacitor 40 is electrically connected to wiring pattern 35 through interlayer connection hole 33. Conductor junction 34 is formed in interlayer connection hole 33, made of a metal layer formed by such as plating or of such as a conductive paste filler.

As shown in FIG. 8, capacitor 40 includes laminated ceramic element 43 and external electrodes 44. Laminated ceramic element 43 is formed of internal electrode layers 42 and ceramic layers 41 alternately laminated. External electrodes 44 continuous with internal electrode layer 42 are disposed at both ends of laminated ceramic element 43. As shown in FIG. 7, a part of external electrode 44 formed on main face 47 is joined to conductor junction 34.

External electrode 44 is composed of base electrode layer 45 and metal layer 46. Base electrode layer 45 is formed by applying the end of laminated ceramic element 43 with a conductive paste by dip coating and then baking the paste. Metal layer 46 is formed by plating base electrode layer 45.

In capacitor 40, namely a conventional laminated ceramic electronic component, the part of external electrode 44 on main face 47 is joined to conductor junction 34. Consequently, the part requires an area larger than that of conductor junction 34. This is to retain electrical bonding and bonding strength with conductor junction 34 to ensure the reliability of bonding. Prolonging external electrode 44 on main face 47 to ensure the bonding area results in thick external electrode 44 formed by dip coating due to the viscosity of the conductive paste. For this reason, to implement thinness required in capacitor 40, the thickness of entire laminated ceramic element 43 needs to be reduced. In this case, the number of lamination of ceramic layers 41 and internal electrode layers 42 needs to be reduced, thereby decreasing the capacitance of capacitor 40.

SUMMARY OF THE INVENTION

A laminated ceramic electronic component of the present invention includes a laminated ceramic element, a first external electrode, and a second external electrode. The laminated ceramic element has a function part, a first lead part, and a second lead part. The function part includes first and second internal electrode layers facing each other, and a ceramic layer placed between the first and second internal electrode layers. From the standpoint of appearance, the laminated ceramic element has first and second end faces opposing each other, parallel with the lamination direction of the first and second internal electrode layers and the ceramic layer; and a main face perpendicular to the lamination direction. The main face is provided thereon with a protective layer covering the first internal electrode layer. At the first lead part, the first internal electrode layer is drawn out of the first end face; at the second lead part, the second internal electrode layer is drawn out of the second end face. The first and second lead parts are formed thinner than the function part. The first external electrode has a first extended part and a first curled part; the second external electrode has a second extended part and a second curled part. The first extended part is formed from the first lead part through the function part on the main face; the second extended part is formed from the second lead part through the function part on the main face. The parts of the first and second extended parts on the first and second lead parts are lower than the parts on the function part. The first curled part is formed from the first end face of the laminated ceramic element through the surface of the part of the first extended part on the first lead part. The second curled part is formed from the second end face through the surface of the part of the second extended part on the second lead part.

DETAILED DESCRIPTION OF THE INVENTION

Figure 1:
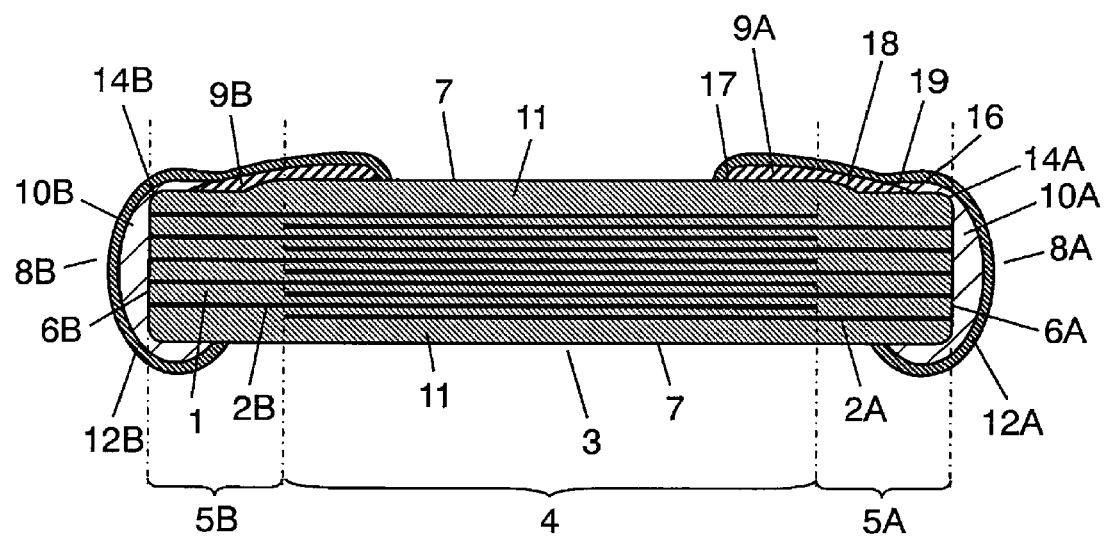
FIG. 1 is a sectional view of a laminated ceramic capacitor according to an embodiment of the present invention.
Figure 2:
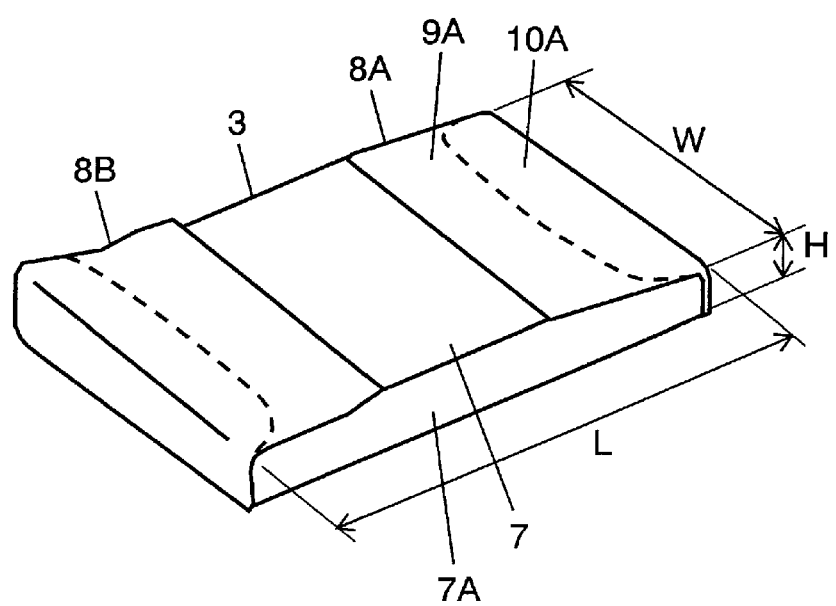
FIG. 2 is a perspective view of the laminated ceramic capacitor shown in FIG. 1.

A description is made of a laminated ceramic capacitor as an example of a laminated ceramic electronic component according to an embodiment of the present invention. FIG. 1 is a sectional view of a laminated ceramic capacitor according to the embodiment of the present invention. FIG. 2 is a perspective view of the capacitor.

The laminated ceramic capacitor includes laminated ceramic element 3, external electrode 8A as a first external electrode, and external electrode 8B as a second external electrode. Laminated ceramic element 3 is rectangular, and includes internal electrode layers 2A as first internal electrode layers, internal electrode layers 2B as second internal electrode layers, and ceramic layers 1. Laminated ceramic element 3 has at least one set of internal electrode layers 2A, 2B, and external electrodes 8A, 8B are placed on both ends of laminated ceramic element 3.

Internal electrode layers 2A, 2B have a given pattern, where each one end of them is drawn and exposed on end faces 6A, 6B of laminated ceramic element 3, and are alternately laminated through ceramic layer 1. End faces 6A, 6B are first and second end faces facing each other, respectively, parallel with the lamination direction of internal electrode layers 2A, 2B and ceramic layer 1. Both ends of the lamination direction of internal electrode layers 2A, 2B and ceramic layer 1 are provided thereon with two main faces 7 perpendicular to the lamination direction. Each main face 7 is provided with protective layer 11 covering internal electrode layers 2A, 2B.

Main faces 7 are surfaces of laminated ceramic element 3, crossing end faces 6A, 6B, placed along the lamination-face direction of internal electrode layers 2A, 2B and ceramic layer 1. That is, two main faces 7 are top and bottom surfaces of laminated ceramic element 3.

Laminated ceramic element 3 is provided therein with function part 4 at the center. Function part 4 is a region formed by internal electrode layers 2A, 2B facing each other and overlapping through ceramic layer 1, producing the capacitance component of the laminated ceramic capacitor.

Both ends of laminated ceramic element 3 are provided thereon with lead parts 5A, 5B, where lead part 5A is a first lead part and lead part 5B is a second lead part. Lead parts 5A, 5B are regions where internal electrode layers 2A, 2B placed in function part 4 are drawn out to end faces 6A, 6B. External electrodes 8A, 8B are electrically connected with function part 4 through internal electrode layers 2A, 2B provided in lead parts 5A, 5B.

Function part 4 is formed constant in thickness. Lead parts 5A, 5B are formed thinner than function part 4. That is, lead parts 5A, 5B are lower than function part 4 on upper main face 7.

Ceramic layer 1 is made of ceramic particles of a dielectric material primarily containing such as barium titanate and strontium titanate. Internal electrode layers 2A, 2B contain metals such as nickel, palladium, and platinum. Protective layer 11 is formed of insulative ceramic particles. The particles are preferably made of the same material as that of ceramic particles of the dielectric material forming ceramic layer 1.

As shown in FIGS. 1, 2, external electrode 8A has extended part 9A and curled part 10A; external electrode 8B has extended part 9B and curled part 10B. Extended part 9A is a first extended part; extended part 9B is a second extended part. Curled part 10A is a first curled part; curled part 10B is a second curled part.

Further, the surfaces of extended part 9A and curled part 10A have metal layer 12A formed thereon; the surfaces of extended part 9B and curled part 10B have metal layer 12B formed thereon. Metal layers 12A, 12B are layers plated with such as copper, nickel, and tin, making favorable electrical connection between the conductor junction of the printed wiring board and laminated ceramic element 3.

Next, a description is made of extended part 9A of external electrode 8A. Extended part 9A is formed by printing a conductive paste on laminated ceramic element 3. Extended part 9A is a thin-film conductor containing conductive particles of a base metal (e.g. nickel, copper) or of a noble metal (e.g. silver, palladium). Extended part 9A is preferably 2 to 20 μm in thickness. Extended part 9A preferably contains ceramic particles to enhance the bonding strength with laminated ceramic element 3. The ceramic particles are more preferably of the same material as those forming protective layer 11. Extended part 9A may be a thin film formed by gas phase method such as deposition or sputtering.

Extended part 9A is placed from function part 4 through lead part 5A on upper main face 7. Here, extended part 9A may be formed on both surfaces of upper and lower main faces 7 (not illustrated). However, in order to make thickness H of the laminated ceramic capacitor smaller, extended part 9A is preferably placed only on one main face 7. That is, extended part 9A may be placed only on upper or lower main face 7.

With the surface of function part 4 being flat, placing extended part 9A over function part 4 allows the conductor junction on the printed wiring board to be joined stably. Further, the junction area is ensured to prevent inadequate junction due to variations in the position of junction with the printed wiring board.

End 16 of extended part 9A at end face 6A is placed on the surface of lead part 5A while contacting ridgeline 14A (first ridgeline where end face 6A crosses main face 7) or being apart from ridgeline 14A. That is, end 16 is not formed on ridgeline 14A or end face 6A. Here, ridgeline 14A is preferably R-chamfered or its cross section is formed in an ellipsoidal curve.

Next, a description is made of curled part 10A of external electrode 8A. Curled part 10A is formed by dip coating a conductive paste. Curled part 10A is a conductive fired substance containing conductive particles of a base metal (e.g. nickel, copper) or a noble metal (e.g. silver, palladium); and glass frit such as silica borate based glass or zinc borate based glass. Curled part 10A may be formed of these conductive particles and a conductive resin body containing a heat-resistant resin with a carbonization temperature of approximately 300° C. or higher, such as an epoxy resin, phenol resin, or polyimide resin.

Curled part 10A is joined to internal electrode layer 2A exposed on the surface of end face 6A; further curls around ridgeline 14A from end face 6A to extend onto main face 7; and formed on the surface of lead part 5A through extended part 9A on lead part 5A. Curled part 10A does not cover the part of extended part 9A on function part 4. That is, curled part 10A is formed from end face 6A through the surface of the part of extended part 9A on lead part 5A.

Curled part 10A is preferably not placed on side 7A crossing end face 6A and main face 7. This allows width W of laminated ceramic element 3 to be enlarged to widen internal electrode layers 2A, 2B, thereby increasing the area of internal electrode layers 2A, 2B facing and overlapping each other. As a result, the capacitance of the laminated ceramic capacitor can be increased.

Further, the part of extended part 9A on lead part 5A is formed lower than that on function part 4. This structure allows the region of lead part 5A to absorb the thickness of curled part 10A at main face 7, which prevents external electrode 8A from projecting from main face 7.

Incline 18 of lead part 5A is provided so that lead part 5A becomes thinner toward end face 6A. That is, lead part 5A is inclined so as to become thinner toward end face 6A. Incline 19 of extended part 9A is provided so that the thickness of extended part 9A becomes thinner toward end face 6A on lead part 5A. That is, the part of extended part 9A on lead part 5A is inclined so as to become thinner toward end face 6A. In this way, at least either incline 18 of lead part 5A or incline 19 of extended part 9A is preferably provided.

On main face 7, curled part 10A is formed so as to become thinner from end face 6A toward function part 4, in the reverse direction of inclines 18, 19. Hence, providing inclines 18, 19 makes the inclination of the surface of curled part 10A gentle, thereby planarizing this part. Consequently, joining of external electrode 8A with the conductor junction on the printed wiring board becomes stable, thereby improving the reliability of joining.

In addition, on main face 7, the difference in height is preferably small between the surface of curled part 10A and that of the part of extended part 9A on function part 4. Both surfaces are more preferably at the same level, which makes flat the part of external electrode 8A on main face 7.

In a case where curled part 10A is formed by dip coating, curled part 10A tends to be formed so as to bulge more thickly in the center of the flat surface coated. For this reason, curled part 10A is preferably formed so that the thickness of curled part 10A at the main face 7 side is maximized at ridgeline 14A and becomes thinner toward function part 4. In this way, the thickness of curled part 10A at the main face 7 side can be reduced.

Hereinbefore, the description is made of extended part 9A and curled part 10A. Extended part 9B and curled part 10B of external electrode 8B are provided in the same way as extended part 9A and curled part 10A as shown in FIG. 1, and thus their detailed description is omitted.

Here, the thicknesses of extended parts 9A, 9B, curled parts 10A, 10B are described with the surfaces on which they are formed as references, respectively.

As described above, the thickness of lead parts 5A, 5B is thinner than that of function part 4. Further, on main face 7, the parts of extended parts 9A, 9B on lead parts 5A, 5B are formed lower than those on function part 4. This structure absorbs the thicknesses of curled parts 10A, 10B at the main face 7 side by the regions of lead parts 5A, 5B, thereby preventing external electrodes 8A, 8B from projecting from main face 7. Hence, function part 4 can be made thick under the restriction of the thickness of a laminated ceramic capacitor for multi-lamination.

Figure 3:
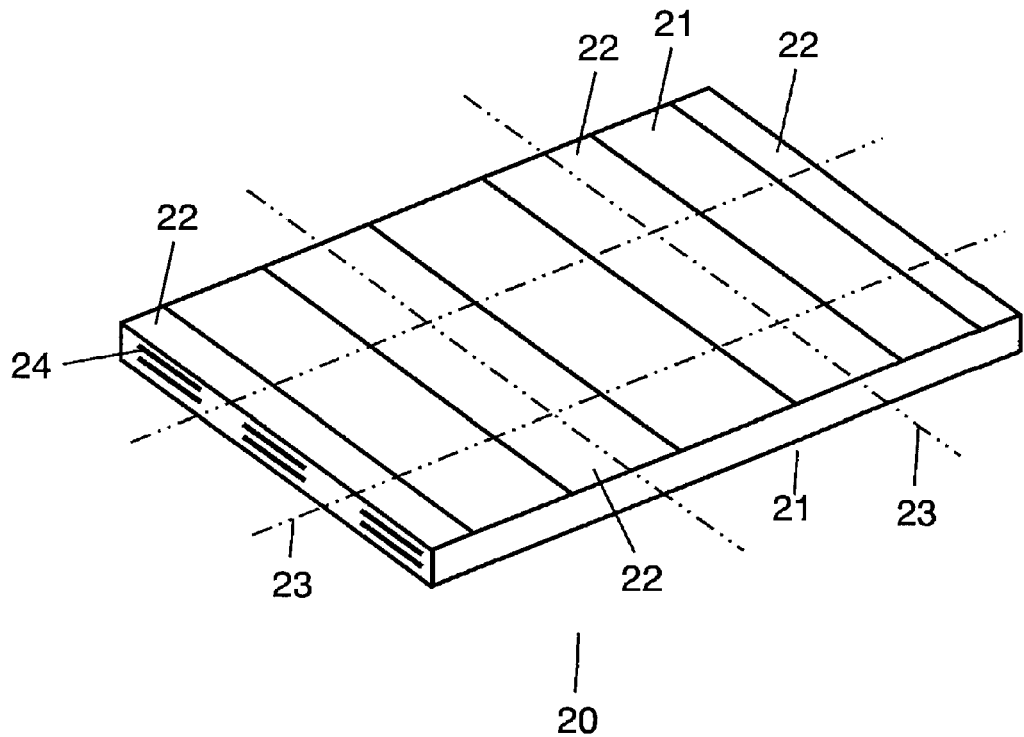
FIG. 3 is a perspective view of a laminated body with an extended part formed thereon, in the procedure of producing the laminated ceramic capacitor shown in FIG. 1.
Figure 4:
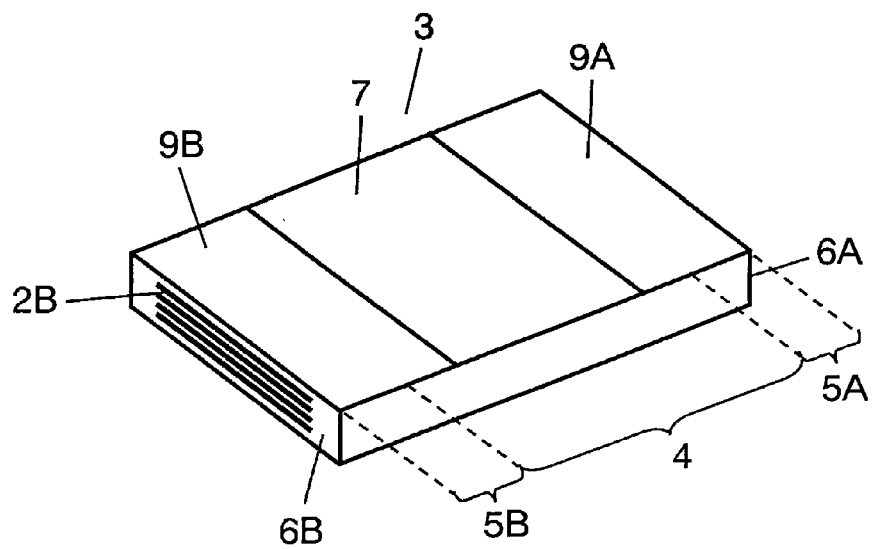
FIG. 4 is a perspective view of a fragment produced by cutting off the laminated body shown in FIG. 3.
Figure 5A:
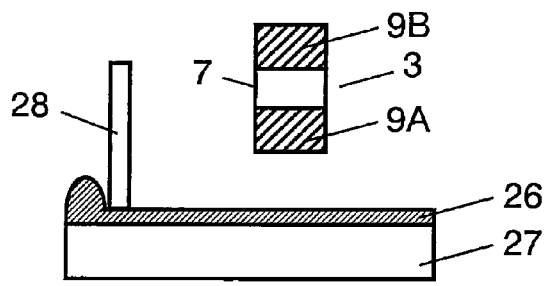
FIGS. 5A through 5C are side views showing the procedure of dip coating to make a curled part when producing a laminated ceramic capacitor according to the embodiment of the present invention.
Figure 5B:
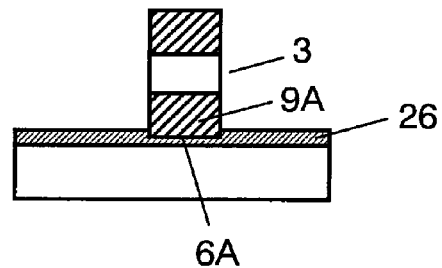
Figure 5C:
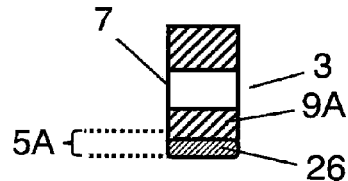
Figure 6:
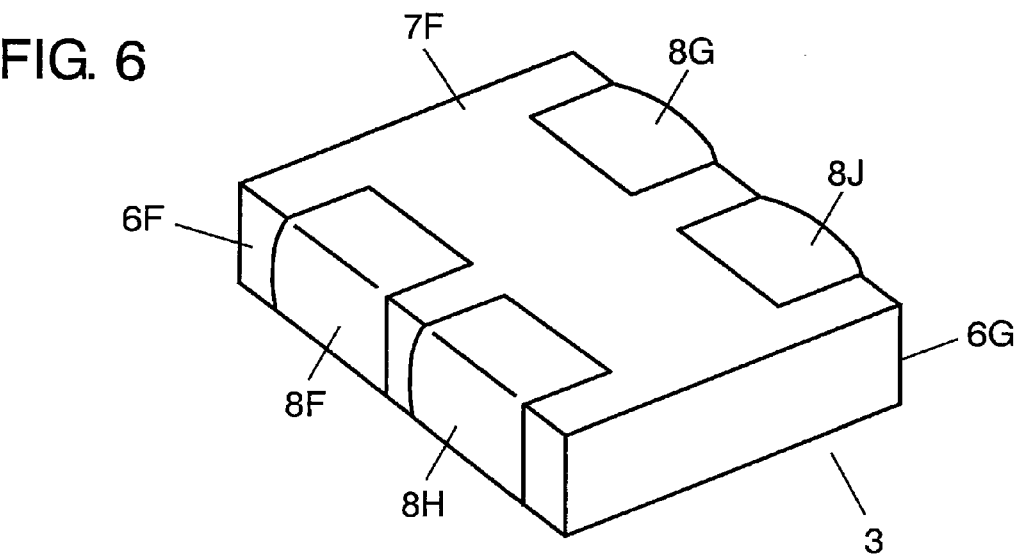
FIG. 6 is a perspective view of another laminated ceramic capacitor according to the embodiment of the present invention.
Figure 7:
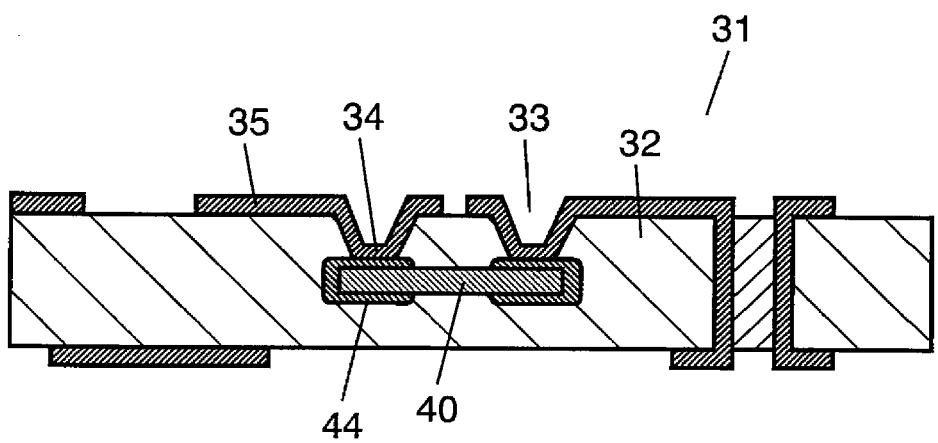
FIG. 7 is a sectional view of a conventional component-embedded printed wiring board.

Next, a description is made of a method of producing a laminated ceramic capacitor of the embodiment in reference to FIGS. 3 through 5C. FIG. 3 is a perspective view of a laminated body with an extended part formed thereon, in the procedure of producing the laminated ceramic capacitor according to the embodiment of the present invention. FIG. 4 is a perspective view of a fragment produced by cutting off the laminated body. FIGS. 5A through 5C are side views showing the procedure of dip coating to make a curled part.

Laminated body 20 shown in FIG. 3 is formed in the following procedure. First, a coating of ceramic slurry with ceramic particles dispersed therein is applied onto a substrate and dried to form a ceramic green sheet becoming ceramic layer 1. Further, metal paste 24 becoming internal electrode layers 2A, 2B is printed on the ceramic green sheet. Next, a protective sheet made of a ceramic green sheet becoming protective layer 11, plural pieces of ceramic green sheets with above-described metal paste 24 printed thereon, and a protective sheet are sequentially layered and press-bonded. In this way, laminated body 20 is formed.

For example, a rigid plate is disposed on main face 21 becoming one main face 7 of ceramic element 3 through an elastic body, a rigid plate is disposed on main face 21 becoming the other main face 7 directly, laminated body 20 is sandwiched between the rigid plates, and then press-bonded. In this way, as shown in FIG. 1, lead parts 5A, 5B can be positioned lower than function part 4 at one main face 7; at the same level as function part 4 at the other main face 7.

When positioning both main faces 7 of lead parts 5A, 5B lower than function part 4, rigid plates are disposed on both main faces 21 becoming both main faces 7 through an elastic body and press-bonded. Alternatively, crimping is performed by isostatic pressing. Here, pressing may be performed for every lamination.

Subsequently, as shown in FIG. 3, a conductive paste is printed on main face 21 by such as screen printing or gravure printing and dried to form extended part 22. The conductive paste for extended part 22 is prepared by mixing metal powder, ceramic particles, an organic binder, a plasticizer, solvent and the like. That is, the metal paste used to form internal electrode layers 2A, 2B can be used.

Further, laminated body 20 with extended part 22 formed thereon is cut off along cutting line 23 shown in FIG. 3 to be separated into fragments, and then laminated body 20 and extended part 22 are fired to produce laminated ceramic element 3 shown in FIG. 4.

Next, extended parts 9A, 9B are ground so that the parts of extended parts 9A, 9B on lead parts 5A, 5B at main face 7 become thinner than those on function part 4. Extended parts 9A, 9B are ground by performing wet barrel polishing after putting laminated ceramic element 3 with extended parts 9A, 9B formed thereon, an abrasive, water, and a medium into a barrel container. For a medium, balls made of such as alumina, zirconia, and silica are used. At this moment, by using a medium with a diameter larger than thickness H and smaller than width W of laminated ceramic element 3 shown in FIG. 2, incline 19 of extended part 9A is formed on extended part 9A at the main face 7 side of lead part 5A.

Incline 19 of extended part 9A shown in FIG. 1 is formed from end 16, with a roughly constant thickness from the upper part of incline 19 of extended part 9A to front end 17 of extended part 9A on function part 4. Ridgeline 14A of laminated ceramic element 3 is ground by wet barrel polishing to make laminated ceramic element 3 a curved surface. Extended part 9B and ridgeline 14B as a second ridgeline are formed in the same way as extended part 9A and ridgeline 14A.

Extended parts 9A, 9B may be ground by blasting such as alumina ceramic beads onto extended parts 9A, 9B.

Next, curled parts 10A, 10B are formed on the ends of laminated ceramic element 3 by dip coating. If curled parts 10A, 10B are conductive fired substance, a mixture of metal powder, glass frit, an organic binder, and solvent is used for a conductive paste used in dip coating.

First, as shown in FIG. 5A, after applying conductive paste 26 onto substrate 27, conductive paste 26 is scraped off by blade 28 to form a thin film of conductive paste 26 with a certain thickness. Next, as shown in FIG. 5B, the end of laminated ceramic element 3 with extended part 9A formed thereon is immersed in this thin film. Further, as shown in FIG. 5C, after laminated ceramic element 3 is drawn up and a coat of conductive paste 26 is applied the part from end face 6A of laminated ceramic element 3 through the part of extended part 9A on lead part 5A, paste 26 is dried.

Here, the dimensions and shape of coating applied to curled part 10A can be adjusted by the viscosity of the conductive paste; and the depth, time, and draw-up speed of immersion. Instead of coating the end of laminated ceramic element 3 at one time, a position to be coated may be coated by dividing into plural times.

Furthermore, curled part 10B is coated with conductive paste 26 and then dried in the same way as curled part 10A. Next, conductive paste 26 dried is fired to form curled parts 10A, 10B. After curled parts 10A, 10B are formed, electrolytic plating is performed to form metal layers 12A, 12B, which completes a laminated ceramic capacitor.

As shown in FIG. 2, the present invention is not limited to a laminated ceramic capacitor including a pair of external electrodes 8A, 8B. The present invention is also applicable to an array-type laminated ceramic capacitor in which three or more external electrodes 8F through 8J are formed on end faces 6F, 6G at both ends of laminated ceramic element 3 and on a part of main face 7F.

Further, the above-described structure is applicable to other types of laminated ceramic electronic component such as a laminated varistor including internal electrode layers mutually facing.

Hereinafter, a description is made of effects of this embodiment using a concrete example.

A laminated ceramic capacitor of sample A is produced in the following way. A coating of ceramic slurry with ceramic powder of barium titanate is applied onto a substrate and dried to produce a ceramic green sheet with a thickness of 2.5 µm. A nickel paste containing nickel powder becoming internal electrode layers 2A, 2B is printed onto the ceramic green sheet in a thickness of 1 to 2 µm by screen printing.

Next, 10 pieces of protective sheets made of ceramic green sheets are laminated. On top of these, 30 pieces of the above-described ceramic green sheets on which the metal paste becoming internal electrode layers 2A, 2B is printed are laminated. Further on top of these, 10 pieces of protective sheets are laminated.

After that, both of upper and lower main faces 21 are sandwiched between rigid plates, where one of the rigid plates is placed on one main face 21 laminated shown in FIG. 3 through an elastic body, and then pressed. In this way, laminated body 20 is produced so that the parts becoming lead parts 5A, 5B are positioned lower than the part becoming function part 4 at one main face 7; at the same level as function part 4 at the other main face 7.

A conductive paste for forming extended part 22 is prepared by mixing nickel powder with an average particle diameter of 0.01 to 10 µm; ceramic powder primarily containing barium titanate powder with an average particle diameter of 0.1 to 1.0 µm; and an organic binder such as acrylic resin into a dispersion medium. Nickel powder is contained in a range of 20 to 70 wt %; ceramic powder, 3 to 25 wt %. This conductive paste is printed onto one main face 21 of laminated body 20 in a strip shape by screen printing, and dried to form extended part 22 with a thickness of 7 µm on one main face 21.

Next, laminated body 20 with extended part 22 formed thereon is cut off into fragments. Then, these fragments are heated in the air to remove the binder, and further heated to be fired in a reducing atmosphere of 1,100 to 1,300° C. In this way, as shown in FIG. 4, laminated ceramic element 3 with extended parts 9A, 9B formed thereon are produced.

Subsequently, alumina balls with a diameter larger than the thickness of laminated ceramic element 3 and smaller than the width of the same is used to grind extended parts 9A, 9B by wet barrel polishing. Concretely, alumina balls with a diameter of 0.15 to 0.45 mm are used. Herewith, extended parts 9A, 9B are inclined so that the parts of extended parts 9A, 9B on lead parts 5A, 5B become gradually thinner toward end faces 6A, 6B, respectively.

At this moment, the difference in height is approximately 5 µm between function part 4 and lead parts 5A, 5B at main face 7. The incline of lead parts 5A, 5B has this difference in height. The incline is formed within a range of approximately 50 µm from the boundaries between function part 4 and lead parts 5A, 5B. The parts of lead parts 5A, 5B from the bottom of the incline to the ridgeline are formed in a substantially flat shape.

The length of lead parts 5A, 5B from end faces 6A, 6B to the above-described boundaries is approximately 100 µm, and the radius of the ridgeline is 10 to 15 µm. Extended parts 9A, 9B are formed in a length of approximately 250 µm from end faces 6A, 6B. The difference in height of the incline of extended parts 9A, 9B is 7 µm. The incline is formed over the flat part of lead parts 5A, 5B in a length of approximately 10 to 40 µm, with the end of the curved surface, which is on the main face 7 side of the ridgeline of laminated ceramic element 3, as an origin. The thickness from the top of the incline of extended parts 9A, 9B to the front end of extended parts 9A, 9B formed on function part 4 is approximately 7 µm, roughly uniform.

Next, as shown in FIGS. 5A through 5C, curled part 10A shown in FIG. 1 is formed. Conductive paste 26 for forming curled part 10A is prepared by mixing 50 to 80 wt % of copper powder with an average particle diameter of 1 to 10 µm, 5 to 15 wt % of glass frit, and an organic binder of acrylic resin into a dispersion medium.

The end of laminated ceramic element 3 with extended parts 9A, 9B formed thereon is immersed in a thin film of conductive paste 26 to be applied with the conductive paste. The front end of conductive paste 26 applied is formed on the inclines of extended parts 9A, 9B, and the thickness of conductive paste 26 applied at main face 7 side is adjusted to be maximized at the curved surface of the ridgeline. Simultaneously, coating conditions are adjusted so that conductive paste 26 is not applied on the side faces of laminated ceramic element 3.

Further, after applied conductive paste 26 is dried, it is baked in a reducing atmosphere at a peak temperature of 700 to 900° C. to form curled parts 10A, 10B. The surface of curled part 10A formed at the main face 7 side is formed so that the height of the surface is between 5 to 10 µm with reference to the flat part of lead part 5A of laminated ceramic element 3. Curled part 10A is formed so that its surface is 2 to 7 µm lower than the part of extended part 9A on function part 4, and curled part 10A does not project beyond the part of extended part 9A on function part 4 from main face 7. The height of the surface of curled part 10A at the other main face 7 side is 5 to 10 µm with reference to the lead part of laminated ceramic element 3. The dimension of curled part 10B is the same as curled part 10A.

Subsequently, each base electrode composed of curled parts 10A, 10B and extended parts 9A, 9B is copper plated to form metal layers 12A, 12B having thickness of 5 µm. In this way, external electrodes 8A, 8B are formed. The thickness including laminated ceramic element 3 and external electrodes 8A, 8B is 115 to 125 µm. In this way, 25 pieces of laminated ceramic capacitors are produced with a rated voltage of 4 V, a capacitance of 10 nF, where the nominal length L is 1.0 mm, the nominal width W is 0.5 mm, and the nominal maximum thickness H is 0.15 mm.

Figure 8:
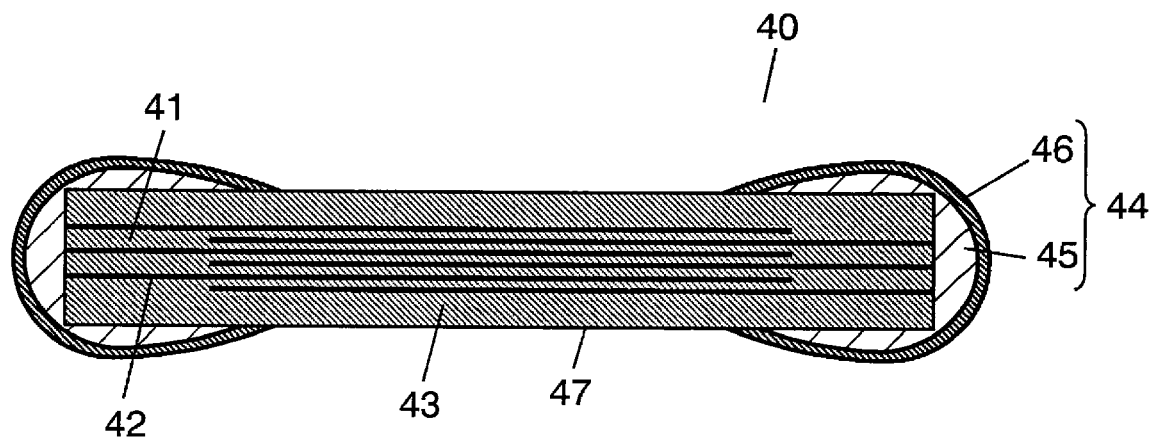
FIG. 8 is a sectional view of a conventional laminated ceramic capacitor.

As sample B, a laminated ceramic capacitor structured as shown in FIG. 8 is produced. In this case, a conductive paste for a curled part of sample A is used to produce a laminated ceramic capacitor so that the length of an external electrode on a main face and the maximum thickness of the laminated ceramic capacitor are the same as those of sample A.

First, 10 pieces of protective sheets of sample A are laminated; on top of these, 10 pieces of ceramic green sheets with a metal paste becoming an internal electrode layer printed thereon are laminated; and additionally 10 pieces of protective sheets are laminated. Subsequently, both sides of the main face are sandwiched between rigid plates and press-bonded to produce a laminated body in which the upper and lower main faces of the lead part and the function part are the same surfaces, respectively. Then, after the laminated body is cut off into fragments without forming an extended part, they are fired in the same way as in sample A to produce laminated ceramic element 43.

Next, each of the end of laminated ceramic element 43 is immersed in a thin film of a conductive paste for a curled part of sample A. At this moment, the depth of immersion is adjusted so that the coating length on main face 47 is 250 μm, same as the length of extended part 9A of sample A. In this way, a conductive paste is coated onto the end faces, main face 47, and the side faces.

Further, in the same way as in sample A, the conductive paste is baked to form base electrodes 45. As shown in FIG. 8, base electrode 45 on main face 47 is formed so as to bulge at the center or in vicinity of the center of base electrode 45 on main face 47, where the maximum thickness is 15 to 25 μm with reference to the function part on main face 47. After that, the surface of each base electrode 45 is copper plated to form metal layer 46 having thickness of 5 μm. In this way, external electrodes 44 are formed.

The thickness including laminated ceramic element 43 and external electrode 44 is 105 to 125 μm. In this way, 25 pieces of laminated ceramic capacitors are produced with a rated voltage of 4 V, a capacitance of 3.3 nF, where the nominal length L is 1.0 mm, the nominal width W is 0.5 mm, and the nominal maximum thickness H is 0.15 mm.

Comparing sample A with sample B, the length of the external electrode on the main face and the maximum thickness of the laminated ceramic capacitor are the same between samples A and B. However, the average value of the capacitance is 10 nF for sample A, while that for sample B is 3.3 nF. Sample A thus provides a larger capacitance than sample B.

Meanwhile, the difference in the height of the surface of the external electrode ranges between 2 and 7 μm for sample A; 15 and 25 μm for sample B. Sample A thus has smaller variation in the height of the surface of the external electrode than sample B. This improves the flatness of the external electrode, thereby allowing the external electrode to join the conductor junction on the printed wiring board stably.

As described above, the present invention ensures the reliability of joining the laminated ceramic electronic component to the conductor junction of the printed wiring board, and allows the laminated ceramic electronic component to be produced with the increased number of lamination of the ceramic layers and internal electrode layers of the function part.

What is claimed is:

1. A laminated ceramic electronic component comprising a laminated ceramic element, a first external electrode and a second external electrode,
   wherein the laminated ceramic element includes:
   a function part having at least one set of first and second internal electrode layers facing each other, and a ceramic layer placed between the first and second internal electrode layers;
   first and second end faces opposing each other, the end faces being parallel to a lamination direction of the first and second internal electrode layers and the ceramic layer;
   a main face perpendicular to the lamination direction of the first and second internal electrode layers and the ceramic layer;
   a protective layer covering the first internal electrode layer on the main face;
   a first lead part in which the first internal electrode layer is drawn out of the first end face, the first lead part being thinner than the function part; and
   a second lead part in which the second internal electrode layer is drawn out of the second end face, the second lead part being thinner than the function part,
   wherein the first external electrode includes:
   a first extended part formed from the first lead part of the laminated ceramic element through the function part on the main face, a part of the first extended part on the first lead part being lower than a part of the first extended part on the function part; and
   a first curled part formed from the first end face of the laminated ceramic element through a surface of a part of the first extended part on the first lead part, and
   wherein the second external electrode includes:
   a second extended part formed from the second lead part of the laminated ceramic element through the function part on the main face, a part of the second extended part on the second lead part being lower than a part of the second extended part on the function part; and
   a second curled part formed from the second end face of the laminated ceramic element through a surface of a part of the second extended part on the second lead part.

2. The laminated ceramic electronic component according to claim 1,
   wherein the first lead part is inclined so as to become thinner toward the first end face, and the second lead part is inclined so as to become thinner toward the second end face.

3. The laminated ceramic electronic component according to claim 1,
   wherein the part of the first extended part on the first lead part is inclined so as to become thinner toward the first end face, and the part of the second extended part on the second lead part is inclined so as to become thinner toward the second end face.

4. The laminated ceramic electronic component according to claim 1,
   wherein the laminated ceramic element has a first ridgeline at which the first end face crosses the main face, and a second ridgeline at which the second end face crosses the main face,
   wherein a thickness of the first curled part on the main face is maximized at the first ridgeline, and
   wherein a thickness of the second curled part on the main face is maximized at the second ridgeline.

5. The laminated ceramic electronic component according to claim 4, wherein
   said first and second ridgelines each have a radius from 10 μm to 15 μm.

6. The laminated ceramic electronic component according to claim 4, wherein
said first and second ridgelines are curved surfaces, and inclination of said first and second extended parts is formed over a flat part of said first and second lead parts in a length of approximately 10 μm to 40 μm, with an end of the curved surfaces on a side of said main face of said first and second ridgelines of said laminated ceramic element being defined as an origin.

7. The laminated ceramic electronic component according to claim 1, wherein
said laminated ceramic element has a first ridgeline at which said first end face crosses said main face and a second ridgeline at which said second end face crosses said main face, and said first and second ridgelines each have a radius from 10 μm to 15 μm.

8. The laminated ceramic electronic component according to claim 1 or 2, wherein
said laminated ceramic element has a first ridgeline at which said first end face crosses said main face and a second ridgeline at which said second end face crosses said main face, said first and second ridgelines are curved surfaces, and inclination of said first and second extended parts is formed over a flat part of said first and second lead parts in a length of approximately 10 μm to 40 μm, with an end of the curved surfaces on a side of said main face of said first and second ridgelines of said laminated ceramic element being defined as an origin.

9. The laminated ceramic electronic component according to claim 1, wherein
said first and second extended parts are provided on said main face, on surfaces of both of said function part and said first and second lead parts, and said first and second extended parts are formed on only one of two, upper and lower said main faces.

10. The laminated ceramic electronic component according to claim 1, wherein
surfaces of said first and second curled parts are 2 μm to 7 μm lower than surfaces of said first and second extended parts.

11. The laminated ceramic electronic component according to claim 1, wherein
said first and second curled parts do not project beyond said first and second extended parts on said function part toward said main face.

12. The laminated ceramic electronic component according to claim 1, wherein
said first and second curled parts are not provided on a side face crossing said first and second end faces and said main face.

13. The laminated ceramic electronic component according to claim 1, wherein
a height of surfaces of said first and second curled parts at the other said main face is between 5 μm to 10 μm, with reference to the lead part of the laminated ceramic element.

14. The laminated ceramic electronic component according to claim 1, wherein
said first and second curled parts are formed on said first and second lead parts of said laminated ceramic element and they do not reach said function part.

15. The laminated ceramic electronic component according to claim 1, wherein
surfaces of said first and second curled parts on said main surface are flush with surfaces of said first and second extended parts on said function part.

16. The laminated ceramic electronic component according to claim 1, wherein
a largest thickness part of said first and second curled parts on said main face on a side having said first and second extended parts is smaller in thickness than a largest thickness part of said first and second curled parts on the other main face not having said first and second extended parts.

17. The laminated ceramic electronic component according to claim 1, wherein
a thickness including said laminated ceramic element and said first and second external electrodes is from 115 μm to 125 μm.

18. The laminated ceramic electronic component according to claim 1, comprising said laminated ceramic element and said first and second external electrodes, wherein
a nominal length L is 1.0 mm, a nominal width W is 0.5 mm, and a nominal maximum thickness H is 0.15 mm.

19. The laminated ceramic electronic component according to claim 1, wherein
said first and second external electrodes on a side of the main face where said first and second extended parts are formed once decrease in thickness as they are closer to said function part from said first and second end faces and thereafter again increase in thickness.

20. The laminated ceramic electronic component according to claim 1, being also applicable as an array-type laminated ceramic capacitor in which three or more external electrodes are formed on end faces at opposing ends of said laminated ceramic element and on a part of said main face.

* * * * *